N. W. CLARK.
Evaporating Pan.
No. 34,348.
Patented Feb. 11, 1862.
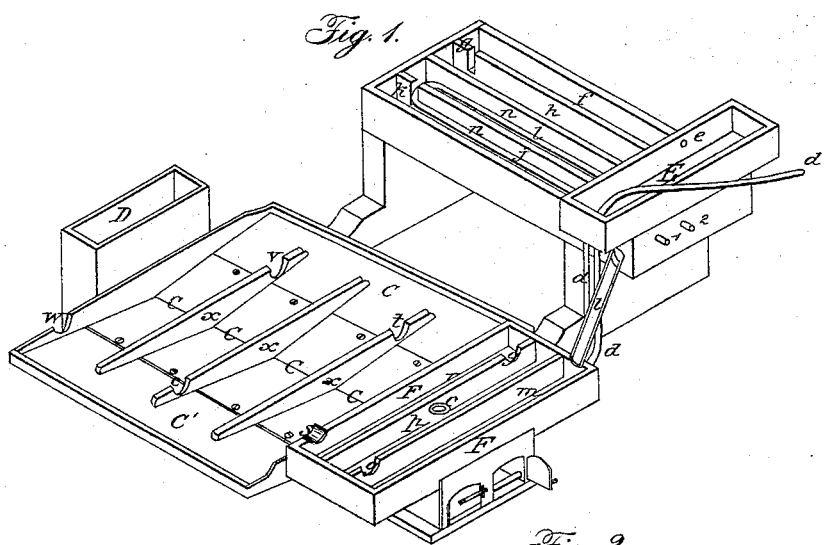
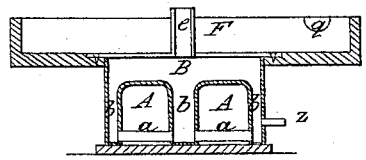
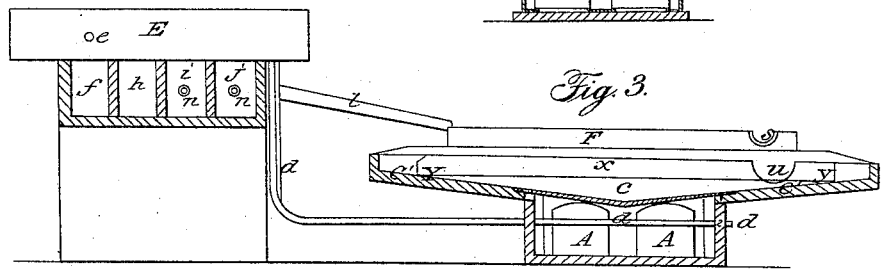
Witnesses:
A. B. Houghton
Harry W. Price
Inventor:
N. W. Clark

UNITED STATES PATENT OFFICE.

NELSON W. CLARK, OF CLARKSTON, MICHIGAN.

IMPROVEMENT IN APPARATUS FOR THE MANUFACTURE OF SALT.

Specification forming part of Letters Patent No. 34,348, dated February 11, 1862.

*To all whom it may concern:*

Be it known that I, NELSON W. CLARK, of Clarkston, in the county of Oakland and State of Michigan, have invented certain new and useful Improvements in the Construction of Salt-Blocks for the Manufacture of Salt; and I do hereby declare the following to be a full, clear, and exact description of the construction and operation of the same, reference being had to the accompanying drawings, making a part of this specification, in which—

Figure 1 represents a perspective view of so much of my salt-block as will illustrate my invention. Fig. 2 represents a vertical transverse section through the furnace, boiler, and heating vat or tank over the boiler; and Fig. 3 represents a similar section through the main flue, evaporating and crystallizing pans, and the heating-reservoir from which the pans are supplied, as will be explained.

Letters Patent of the United States No. 31,372, and dated February 12, 1861, were granted to me for a process of separating and precipitating the salt contained in saline water while the water is continuously flowing through the pans. My present invention is founded on this principle, and in carrying it out I have invented an apparatus which very much reduces the labor and expense and simplifies the operation of salt-boiling.

My invention consists, first, in combining with one or more salt-blocks a reservoir in which the saline water is heated while it is continuously flowing through it on its way to a second heater, or to the pans where the salt is made.

It further consists in combining with a steam-boiler placed over the furnace or fire-chamber a heating-vessel projecting beyond the boiler, in which the saline water is further heated before it passes into the first of the series of evaporating-pans.

It further consists in projecting the sides or ends of the pans over the sides of the salt-block or its main flue, for the purpose of affording a table on which the salt drawn from the pans may drain and dry, while the drainage will flow back into the pans.

It further consists in making the pans of metal where exposed to the fire or highly-heated gases, and of wood beyond these points or parts, so that the saline water shall lie partly upon the wood.

It further consists in so regulating the flow-offs from one pan to the others adjacent to it as that the metal portions of the pans shall be always covered by the saline water, and thus to a very great extent prevent the corrosion of the pans and the staining of the water or of the salt.

In the manufacture of salt as at present practiced, and where a steam-engine is used for pumping up the water, it requires three attendants—one at the pump, one at the engine or boiler, and a third at the salt-block. I propose to so arrange the several operations as that one person may attend to all these duties, and thus save the expense of two men. To this end I arrange the steam-boiler over the furnace in the salt-block, so that one fire will serve the two purposes of making heat for the steam for the engine and heat for the evaporating-pans, and by this arrangement I economize the waste heat of the boiler, as also that of the escaping steam from the engine. The steam-engine is placed in convenient proximity to the boiler and to the pump, so that the attendant is in the immediate locality of all three and can readily attend to the workings of them all; and as often as may be necessary this attendant can pass along the block and draw out from the pans, upon the sloping side or sides thereof, the salt that may have been made therein, allowing it to drain and dry previous to his afterward removing of it.

To enable those skilled in the art to make and use my invention, I will proceed to describe the same with reference to the drawings.

A A represent two furnaces or fire-chambers, over which is placed a boiler, B, that has water-legs $b\ b\ b$, forming the sides of the fire-chamber, and these water-legs may be united at or near their bottoms by hollow grate-bars $a\ a$, through which the water in the boiler may pass to keep up a circulation. The flame and heated products of combustion from the fire-chambers pass through a long flue underneath the series of kettles or pans C, and thence to the stack or chimney D. The steam from the boiler to drive the engine may be taken therefrom by means of the steam-pipe $c$ in any of the usual well-known ways, and the power of the engine may be transmitted to the pump by any of the mechanical appliances used for such a purpose. The saline water from the well, fountain, or reservoir into which it is received may flow through a pipe, $d$, which passes through the rear of the fire-chamber, so as to be heated by the fire, and thence to a tank, E, where it is received in a heated condition. From the tank E the water continues to flow through an opening, $e$, into a vat, $f$, and, passing through said vat, enters at $g$ into a second vat, $h$, and flowing back through $h$, it enters a third vat, $i$. Flowing through $i$, it enters a fourth vat, $j$, at $k$, from which last vat $j$ it may pass by a tube or spout, $l$, into a division, $m$, of a heating-reservoir, F, that is placed over the steam-boiler B. The escape-pipe $n$, for the exhaust-steam from the engine, may pass through the vats $j$ $i$, entering at 1 and passing out at 2, thus economizing the heat of the exhaust-steam, and at a point where the saline water has lost that which it received, to a greater or less degree, from passing through the pipe $d$, as above mentioned. The water from the division $m$ of the reservoir F flows through $o$ into the next division, $p$, and from $p$ it flows through $q$ into a third division, $r$. The steam-pipe $c$ passes up through the middle division, $p$, of the reservoir F, imparting its conducted heat to the saline water in that division; and the reservoir itself, standing upon the boiler B, receives and imparts to its contents the conducted heat from the boiler. The reservoir F extends each way beyond the sides of the boiler, as shown in Figs. 1 and 2, and the water flowing through it from end to end mingles and keeps at a uniform temperature. It will be perceived that thus far the saline water has a continuous flow from the source or fountain to the last division of the reservoir F, receiving in its passage heat from four sources—viz., from the fire through the pipe $d$, from the exhaust-steam passing through the pipe $n$ in the vats $j$ $i$, from the boiler B, over which the reservoir is placed, and, lastly, from the steam-pipe $c$, and that it is in condition to pass on to the pans, where crystallization and precipitation take place, which it does through the opening or spout $s$ into the first pan C, and thence through the series of pans by the openings $t$ $u$ $v$ at alternate ends of said pans, until it arrives at the end of the block, where the water, divested of its salt and containing only impurities, flows off at $w$, so that the flow of water from the source to the place of escape is continuous, it being heated, saturated, and divested of its salt *in transitu*, making the operation a continuous one.

The pans are made concave, or inclining from the sides to the center, and that part of them which overlies the flue-chamber is made of metal, while the sides C' are made of wood. This making of the pans partially of metal and partially of wood prevents the salt from burning to the bottoms of the pans, as its temperature is not excessive and at all times uniform, and leaving the salt in large crystals, more like solar than artificially heated and precipitated salt, and consequently a more marketable commodity. The pans are divided up into a series by means of the divisions or partitions $x$, which extend beyond the metal portions of the pans and onto the wood portions thereof. The water-line in the pans will be at or near the line $y$ of Fig. 3, by which the metal portions of the pans will be constantly covered by the water and not exposed to the air, which not only causes corrosion and consequent injury to the pans, but also accumulates deposits, which, with the corrosion, stain the water and the salt. The pans as they recede from the fire may be contracted in width and depth somewhat, so as to contain less water when the heat becomes less, thus to an extent equalizing the body of water to the degree of heat throughout. As the salt is formed and settles in the pans the attendant, with a proper instrument, draws or scrapes it up onto wooden sides C', where it may lie and drain, the drainings running back into the pans.

I have represented but one salt-block in connection with the heating-vats E $f$ $h$ $i$ $j$. In practice I propose to use a second block like that shown and described on the other side of the vats, as one preparatory vat may furnish heated saline water to two salt-blocks.

$z$, Fig. 2, is the supply-pipe by which water is furnished to the boiler.

I have represented the reservoir, receiver, and the salt-block as subdivided into a certain number of vats or apartments. I do not of course confine myself to these exact divisions, as they may be increased or diminished in number to suit various circumstances that may attach to the operation.

The object of the first heating vat or reservoir is to settle or precipitate some of the impurities of the water, by which means the water goes to the evaporating-pans divested of impurities which would otherwise be mingled with the salt; and an important advantage gained in extending the pans beyond the salt-block or flue is that more evaporating-surface is gained in proportion to the width of the flue or heating-surface applied to the bottom of the pans.

Having thus fully described the nature and object of my invention, what I claim therein as new, and desire to secure by Letters Patent, is—

1. In combination with the salt-block, a heating-reservoir in and through which there is a constant flow of water, substantially as described.

2. In combination with a steam-boiler placed over the furnace of the salt-block, a heating-reservoir, F, placed over and projecting beyond said boiler, for the purpose of utilizing the otherwise wasted heat from and around the boiler, substantially as described.

3. Projecting the sides or ends of the pans over the sides or main flue of the salt-block for the purpose of equalizing the temperature of the water and making the crystallization and precipitation uniform, and for affording a table on which the salt drawn or scraped from the pans may drain, and allow the drainings to run back into the pans, substantially as described.

4. Making the salt-pans of metal and of wood, so arranged and combined as that while the saline water shall lie upon both the metal only shall be exposed to the fire or heated products of combustion, substantially as and for the purpose described.

5. So arranging the flow-offs from one pan to the next adjacent one throughout the series as that the metal portions of the pans shall be always covered by the saline water in them, and thus prevent corrosion of the pans, and consequent destruction, as well as avoiding the staining of the water or discoloring of the salt, as herein set forth and explained.

N. W. CLARK.

Witnesses:
A. B. STOUGHTON,
H. W. PRICE.